United States Patent [19]

Kimura et al.

[11] Patent Number: 5,461,700
[45] Date of Patent: Oct. 24, 1995

[54] ROBOT CONTROL SYSTEM WITH A RECORD SWITCH FOR RECORDING ONLY USEFUL INSTRUCTION/POSITIONAL DATA OF A TEACHING-PLAYBACK ROBOT

[75] Inventors: Yutaka Kimura; Hiroshi Okumura, both of Nagoya, Japan

[73] Assignee: Mitsubishi Jukogyo Kabushiki Kaisha, Tokyo, Japan

[21] Appl. No.: 250,358

[22] Filed: May 27, 1994

Related U.S. Application Data

[63] Continuation of Ser. No. 48,581, Apr. 15, 1993, abandoned, which is a continuation of Ser. No. 463,918, Jan. 10, 1990, abandoned, which is a continuation of Ser. No. 213,525, Jun. 30, 1988, abandoned.

[30] Foreign Application Priority Data

Oct. 23, 1987 [JP] Japan .................................. 62-266527

[51] Int. Cl.$^6$ .................................................... G05B 19/42
[52] U.S. Cl. .................. 395/80; 395/83; 395/88; 395/89; 318/567; 318/568.1; 318/568.11; 318/568.12; 318/568.13; 364/474.02; 364/275.3; 364/DIG. 1
[58] Field of Search .................... 395/1, 800, 80, 395/84, 88, 89, 83; 318/500, 567, 568.1, 568.11, 568.12, 568.13; 364/513, 474.02

[56] References Cited

U.S. PATENT DOCUMENTS

| | | | |
|---|---|---|---|
| 3,909,600 | 11/1975 | Hohn | 395/86 |
| 4,030,617 | 6/1977 | Richter | 414/4 |
| 4,130,873 | 12/1978 | Fioretta et al. | 395/80 |
| 4,132,938 | 1/1979 | Sano et al. | 318/568.1 |
| 4,187,454 | 2/1980 | Ito et al. | 318/568.14 |
| 4,224,501 | 9/1980 | Lindbom et al. | 219/124.34 |
| 4,385,358 | 5/1983 | Ito et al. | 395/87 |
| 4,403,281 | 9/1983 | Holmes et al. | 364/474.35 |
| 4,420,812 | 12/1983 | Ito et al. | 395/87 |
| 4,433,382 | 2/1984 | Cunningham et al. | 364/474.34 |
| 4,481,569 | 11/1984 | Hoodbhoy | 364/183 |
| 4,492,847 | 1/1985 | Masaki et al. | 219/124.34 |
| 4,495,588 | 1/1985 | Nio et al. | 395/86 |
| 4,503,507 | 3/1985 | Takeda et al. | 395/84 |
| 4,549,276 | 10/1985 | Inaba et al. | 395/88 |
| 4,571,694 | 2/1986 | Inaba et al. | 395/88 |
| 4,587,618 | 5/1986 | Oguchi | 395/88 |
| 4,594,670 | 6/1986 | Itoh | 395/89 |
| 4,608,651 | 8/1986 | Murakami | 395/85 |
| 4,642,752 | 2/1987 | Debarbieri et al. | 364/474.02 |
| 4,743,819 | 5/1988 | Hashizume | 395/87 |
| 4,777,608 | 10/1988 | Hashimoto et al. | 395/82 |
| 4,803,640 | 2/1989 | Mitomi et al. | 395/87 |
| 4,815,007 | 3/1989 | Sakai et al. | 395/88 |
| 5,003,237 | 3/1991 | Kimura | 318/572 |

FOREIGN PATENT DOCUMENTS

| | | |
|---|---|---|
| 2279521 | 2/1976 | France . |
| 15210 | 1/1986 | Japan . |
| 207911 | 3/1986 | Japan . |
| 61-208515 | 9/1986 | Japan . |
| 161511 | 12/1986 | Japan . |
| 208515 | 4/1987 | Japan . |
| 1511168 | 5/1978 | United Kingdom . |

OTHER PUBLICATIONS

English Translation of JP, Kokai No. 61–208515 pp. 1–9.

*Primary Examiner*—Krisna Lim
*Attorney, Agent, or Firm*—McAulay Fisher Nissen Goldberg & Kiel

[57] ABSTRACT

The disclosed method involves teaching a robot by moving a robot member and sampling its position at predetermined times. Only position data changed more than a predetermined difference from the last stored position data are recorded as instruction data and the instruction data are played back as position data at predetermined times independent of the time required to move the robot member in the teaching steps.

2 Claims, 6 Drawing Sheets

ROBOT CONTROL SYSTEM WITH A RECORD SWITCH FOR RECORDING ONLY USEFUL INSTRUCTION/POSITIONAL DATA OF A TEACHING-PLAYBACK ROBOT

This is a continuation of application Ser. No. 08/048,581, filed Apr. 15, 1993, now abandoned, which is a continuation of Ser. No. 07/463,918, filed Jan. 10, 1990, now abandoned, which is a continuation of Ser. No. 07/213,525, filed Jun. 30, 1988, now abandoned.

FIELD OF THE INVENTION AND RELATED ART STATEMENT

The present invention relates to a method of recording and playing back instruction data in a robot of a teaching and playback type.

Conventional recording methods of instruction data in a robot of the teaching and playback type involve a PTP (point-to-point) method in which only positional data of main several points on a moving locus of the robot are stored as the instruction data and a CP (continuous path) method in which a machine body of the robot including an arm and the like is directly moved by an operator and its moving locus is continuously recorded as the instruction data. In the latter method, when the moving locus is stored as the instruction data, the locus is sampled at predetermined intervals (every recording period of the instruction data) to record the positional data and the start and the stop of recording the data are effected by operation of a switch.

The CP method is effective to teach a minute moving locus of the machine body of the robot, while the automatic recording of the instruction data every recording period of the instruction data and the direct movement of the machine body of the robot by the operator cause problems as follows:

(1) When the teaching operation is temporarily interrupted, it is necessary to operate a switch stop the recording after the robot has become stationary and it is also necessary to operate the switch when the recording is resumed. Thereafter, the robot is moved again. As shown in FIG. 5, the robot rests at the same position from time 5t to 13t, that is, from positional data $P_5$ to $P_{10}$ and the recording of the positional data is stopped. Accordingly, the switch operation for stopping and resuming the recording becomes troublesome and excessive memory space is used by recording useless steps $P_5$ to $P_9$ before and after the time when the recording switch is turned off. In addition, occurrence of the unnecessary stationary state of the robot lengthens the cycle time of the robot unnecessarily. FIG. 5 shows the operating state of the robot. T is a period of producing an operation command.

(2) The recording operation of functional data for control of a tool mounted on a hand of the robot and the interlocking operation with the outside necessary for the playback operation of the robot is made while reproducing the position after recording only the positional data so that unnecessary steps are not recorded. Accordingly, the teaching operation occurs twice from the beginning of a program and hence takes time.

OBJECT AND SUMMARY OF THE INVENTION

Accordingly, the present invention has been made in order to solve the above problems (1) and (2) and an object of the present invention is to provide a method of recording and playing back instruction data in a robot in which effective use of a limited memory capacity and shortening of cycle time are attained without useless steps in the CP method.

Another object of the present invention is to provide a method of recording and playing back instruction data in a robot in which troublesome switch operation can be eliminated to realize simple teaching.

In order to achieve the above objects, the method of recording and playing back instruction data in the robot according to the present invention in which a machine body including a plurality of arms or/and axes is moved to sample a moving locus thereof every predetermined time to effect teaching, is characterized by:

rerecording as instruction data only data of a position or positions of each of the plurality of arms or/and axes moved more than a predetermined significant difference from positions of which data have been stored in recording means at the last time and playing back the instruction data as positional data every predetermined time independent of a time required to move the machine body upon teaching by means of control means.

In operation of the present invention, only data of a position or positions of each of the arms or/and axes moved more than the predetermined significant difference from positions of which data have been stored already are recorded as instruction data and the instruction data are played back every predetermined time. Accordingly, when the robot is at a standstill, the recording of the instruction data is not effected.

As described above, when the teaching of the locus is made by the method according to the present invention, an operation program can be prepared by a limited memory capacity effectively and further the cycle time can be shortened.

The teaching operation can be simplified and in addition the playback locus can not be influenced by temporary interruption of the teaching operation.

DETAILED DESCRIPTION OF A PREFERRED EMBODIMENT

Figure 1:
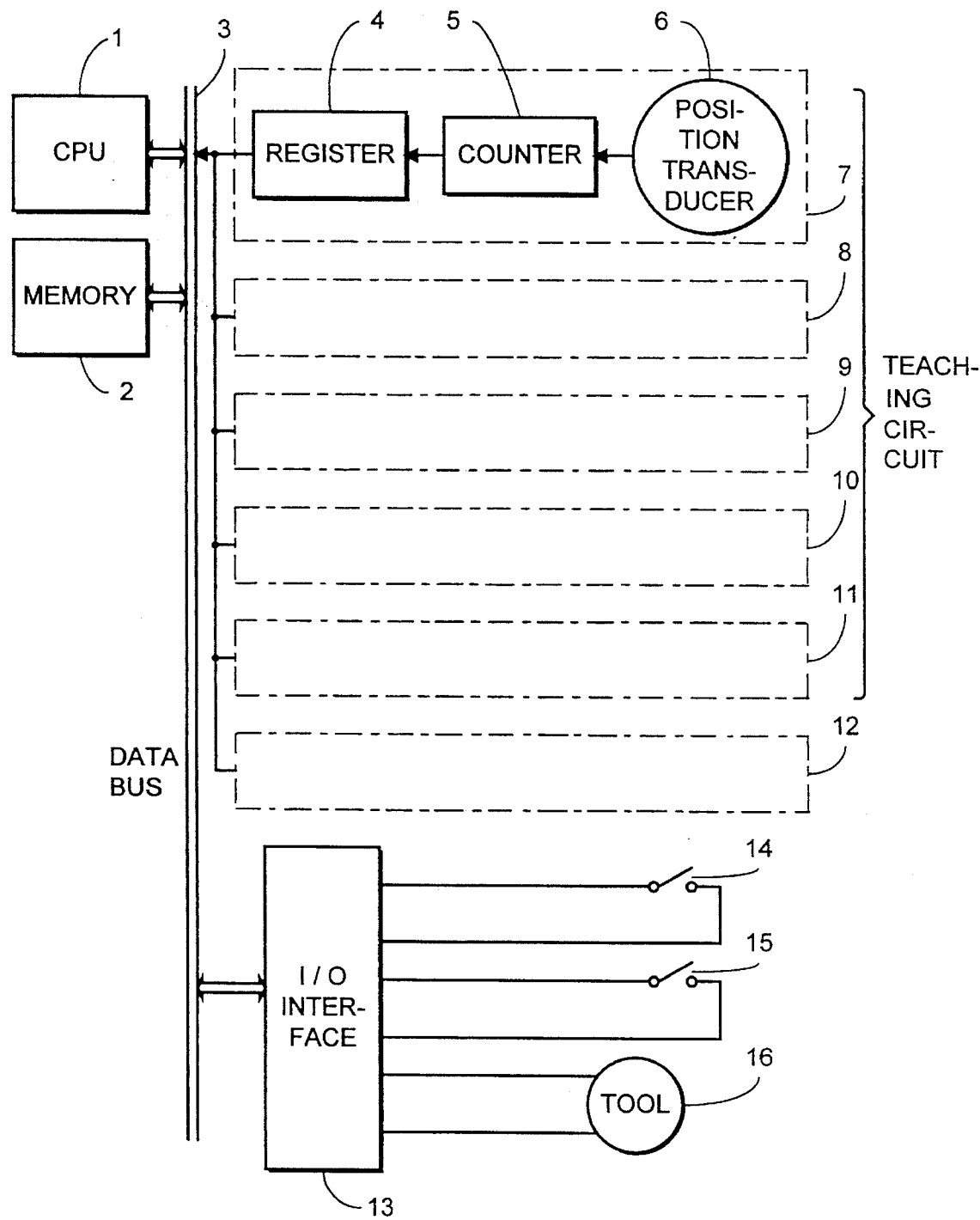
FIG. 1 is a block diagram showing a circuit configuration for teaching a locus to a robot of six axes control type according to an embodiment of the present invention.
Figure 2:
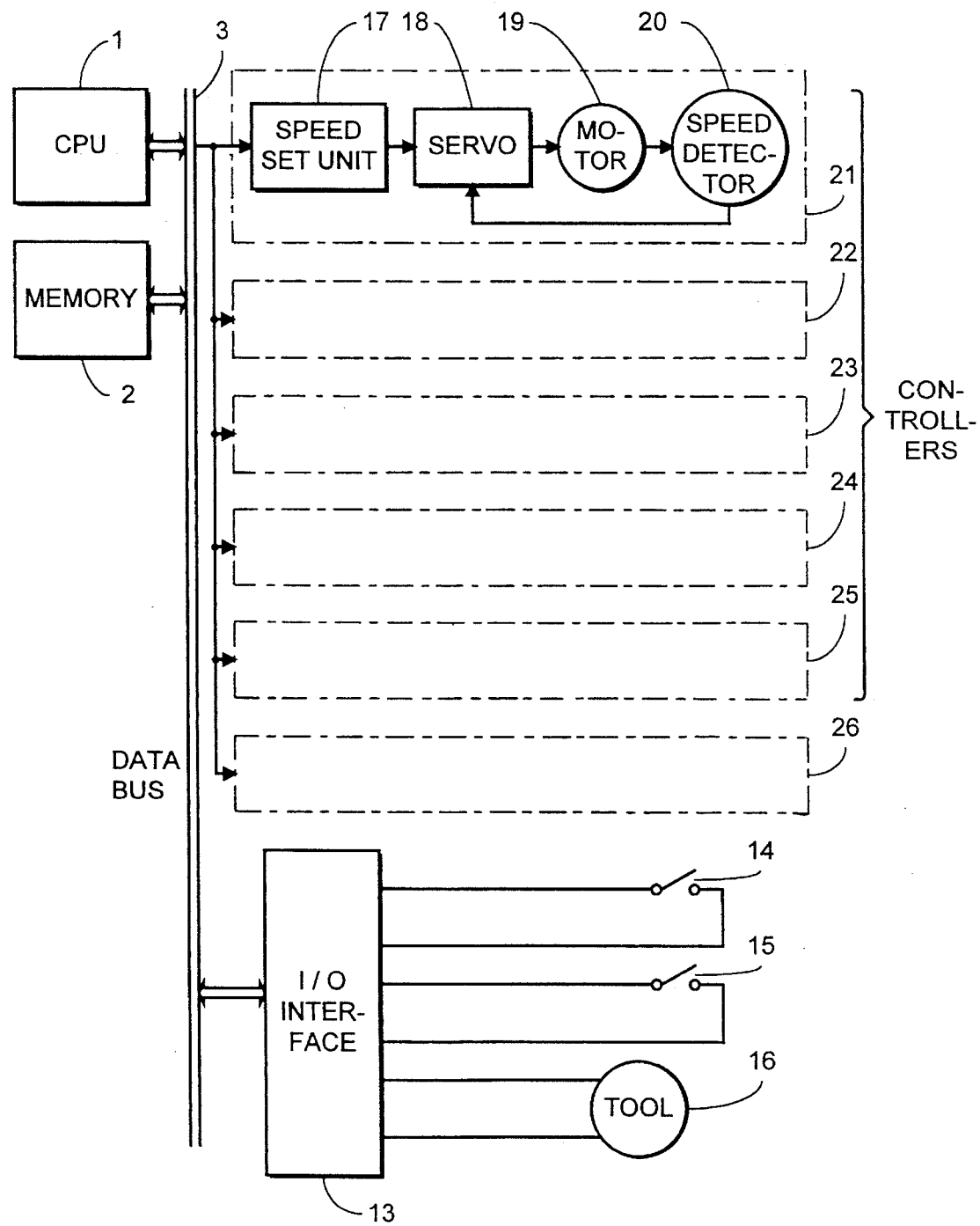
FIG. 2 is a block diagram showing a circuit configuration for driving the robot of six axes control type according to an embodiment of the present invention.

FIGS. 1 and 2 show circuit configurations for teaching a locus to a robot of six axes control type and controlling operation of the robot. In FIG. 1, when an operator moves an arm or part of a machine body of a robot to teach its locus to the robot, positional pulses are produced from a position transducer 6 mounted to each axis of the robot. The pulses are counted by a counter 5 and latched by a register 4 as pulse data every recording period t of instruction data. A locus teaching circuit 7 having the same function as aforementioned above is also provided in other five axes as locus teaching circuits 8 to 12.

The pulse data latched in the register 4 are stored in a memory 2 under predetermined conditions by a central processing unit (CPU) which controls the robot. The predetermined conditions are defined as follows.

(1) when a record switch 14 for recording data into the memory 2 is turned on from its off state thereof; and (2) when the data latched in the register 4 of at least any one of six axes is changed more than a predetermined constant ΔL from the data last stored in the memory 2 in the on state of a record switch 14.

A tool 16, for example a spray gun, attached to a tip of a wrist axis of the robot is turned on when a control switch 15 for the tool is on and the data of the register 4 defined in the above condition (2) is larger than the constant ΔL. This state is also recorded in the memory 2 at the same time as the positional data. In FIG. 1, numeral 3 denotes a data bus and numeral 13 denotes an input/output (I/O) interface.

FIG. 2 shows a circuit configuration for controlling operation of the robot. The CPU 1 serves to supply a speed command to a speed setting unit 17 of each axis every output period T of an operation command on the basis of the positional data already stored in the memory 2 to operate a motor 19 through a servo circuit 18 to effect playback of the robot. Numeral 20 denotes a speed detector and controllers 21 to 26 are provided for each axis, respectively. In addition, the tool 16 is controlled to be turned on and off on the basis of functional data recorded at the same time as the positional data.

Figure 3:
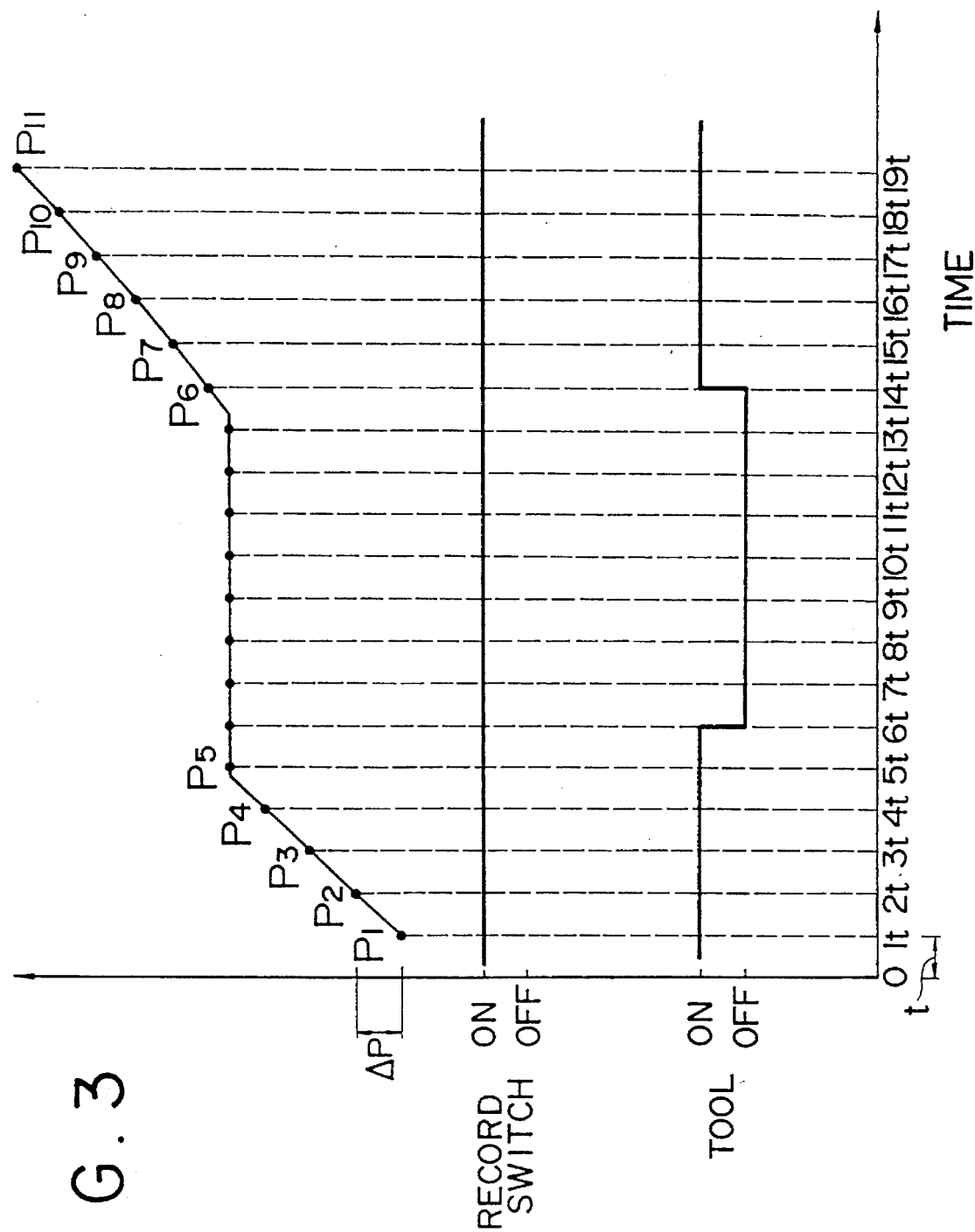
FIG. 3 is a diagram illustrating a locus of an axis and positional data stored in a memory by the teaching method of the present invention.

Thus, the recording of the instruction data as shown in FIG. 3 occurs only when the record switch is turned on from its off state or only when the data latched in the register 4 is changed more than the constant ΔL from the data stored in the memory 2 at the last time. Accordingly, the storing of data into the memory 2 and the recording of operation of the tool 16 into the memory 2 are not performed from the time 5t to 13t, that is, from when the robot stands still to when the robot is moved again. More particularly, the difference ΔP between the positional data last stored in the memory 2 and the data latched in the register 4 is compared with the predetermined constant ΔL if ΔP>ΔL in at least any one of six axes, data Pi in the register 4 is stored in the memory 2. ΔL is the constant having a minute value for neglecting small swinging or deflection of a value of the position transducer 6 and small movement of the robot which is rested by the operator (from 5t to 13t of FIG. 3) and is regarded as zero within a significant error range, for example.

Figure 4:
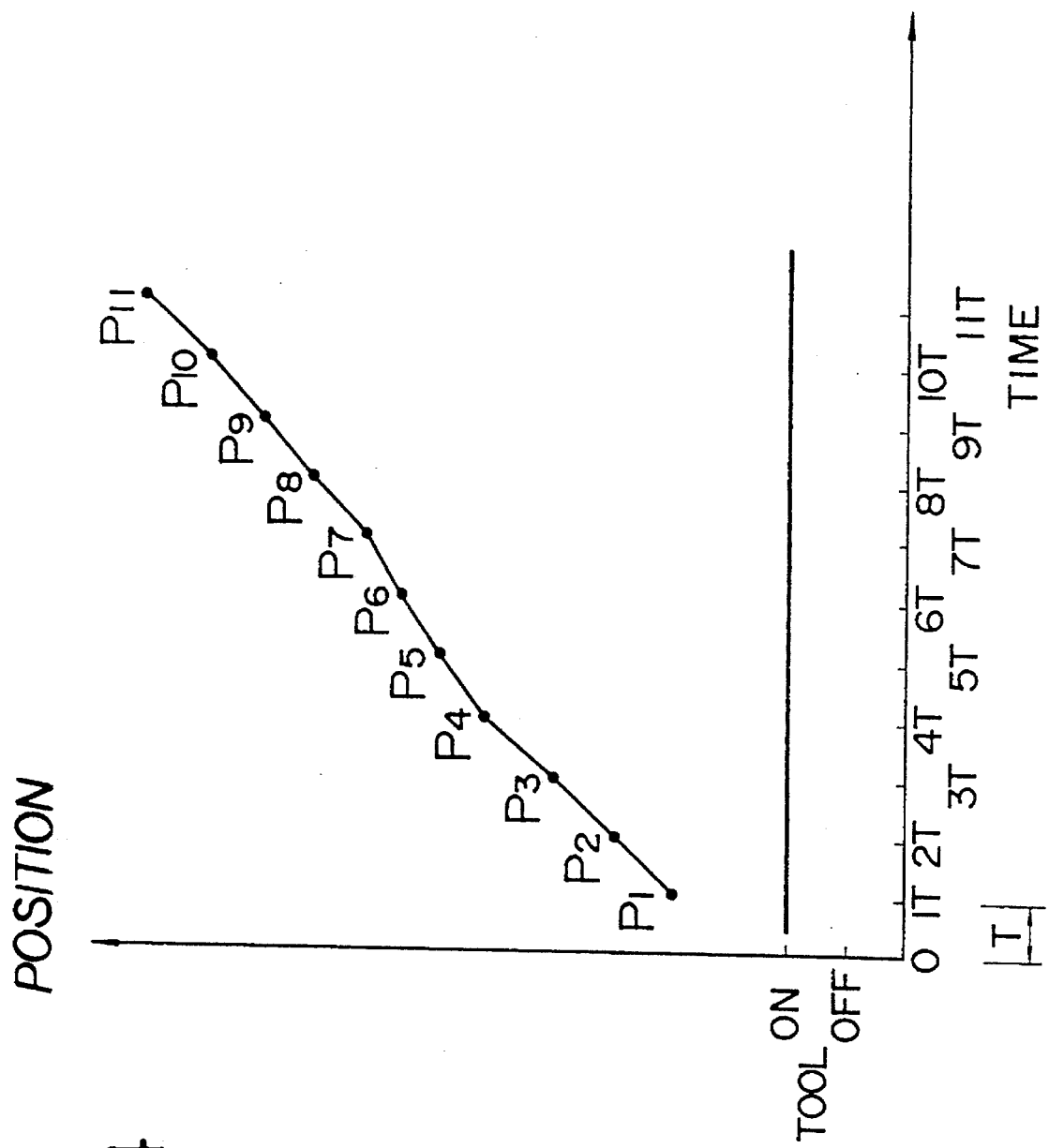
FIG. 4 is a diagram illustrating a locus of an axis of a robot when instruction data stored by the teaching method shown in FIG. 3 is played back.
Figure 5:
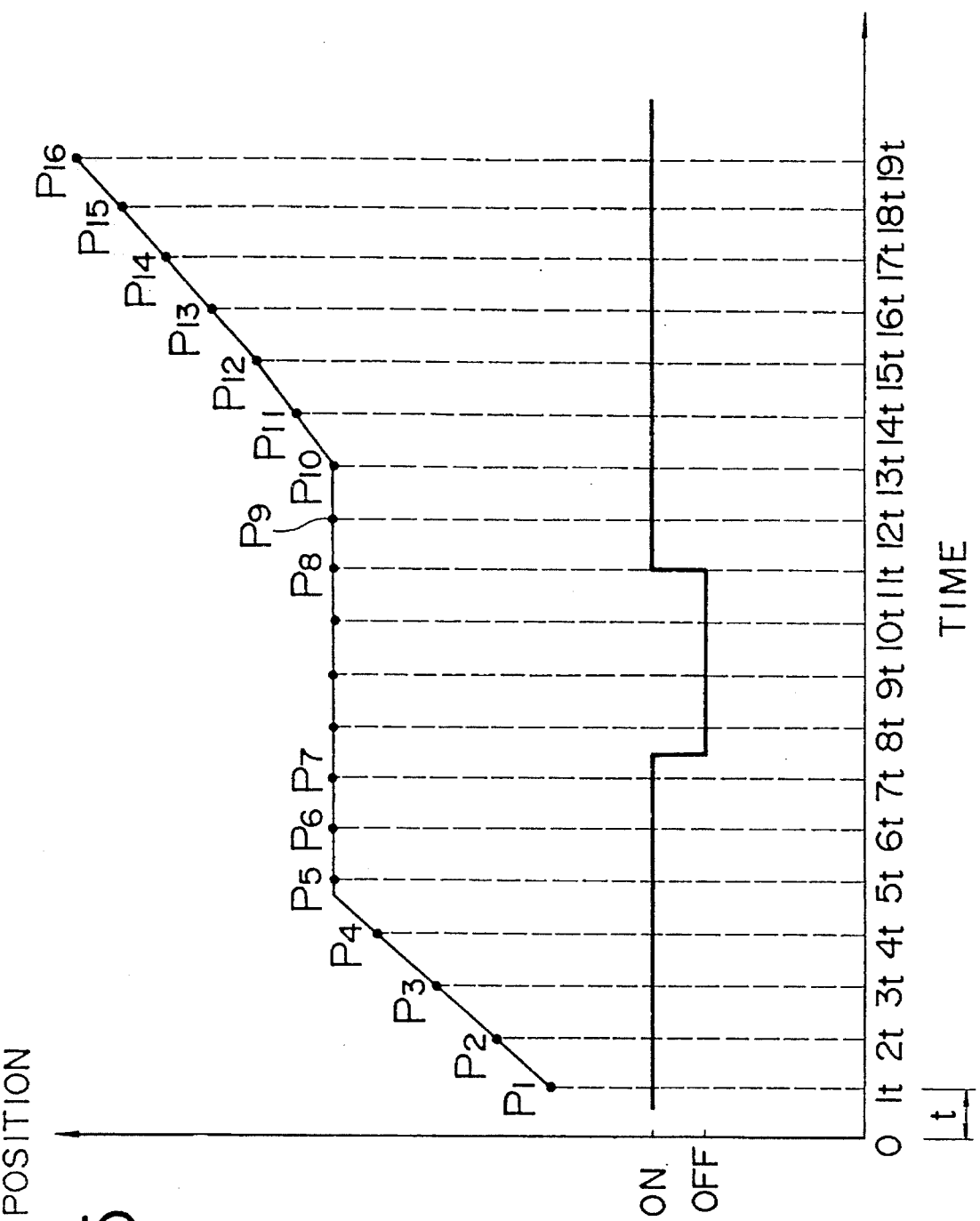
FIG. 5 is a diagram illustrating a locus of an axis and positional data stored in a memory of a robot in a prior art.
Figure 6:
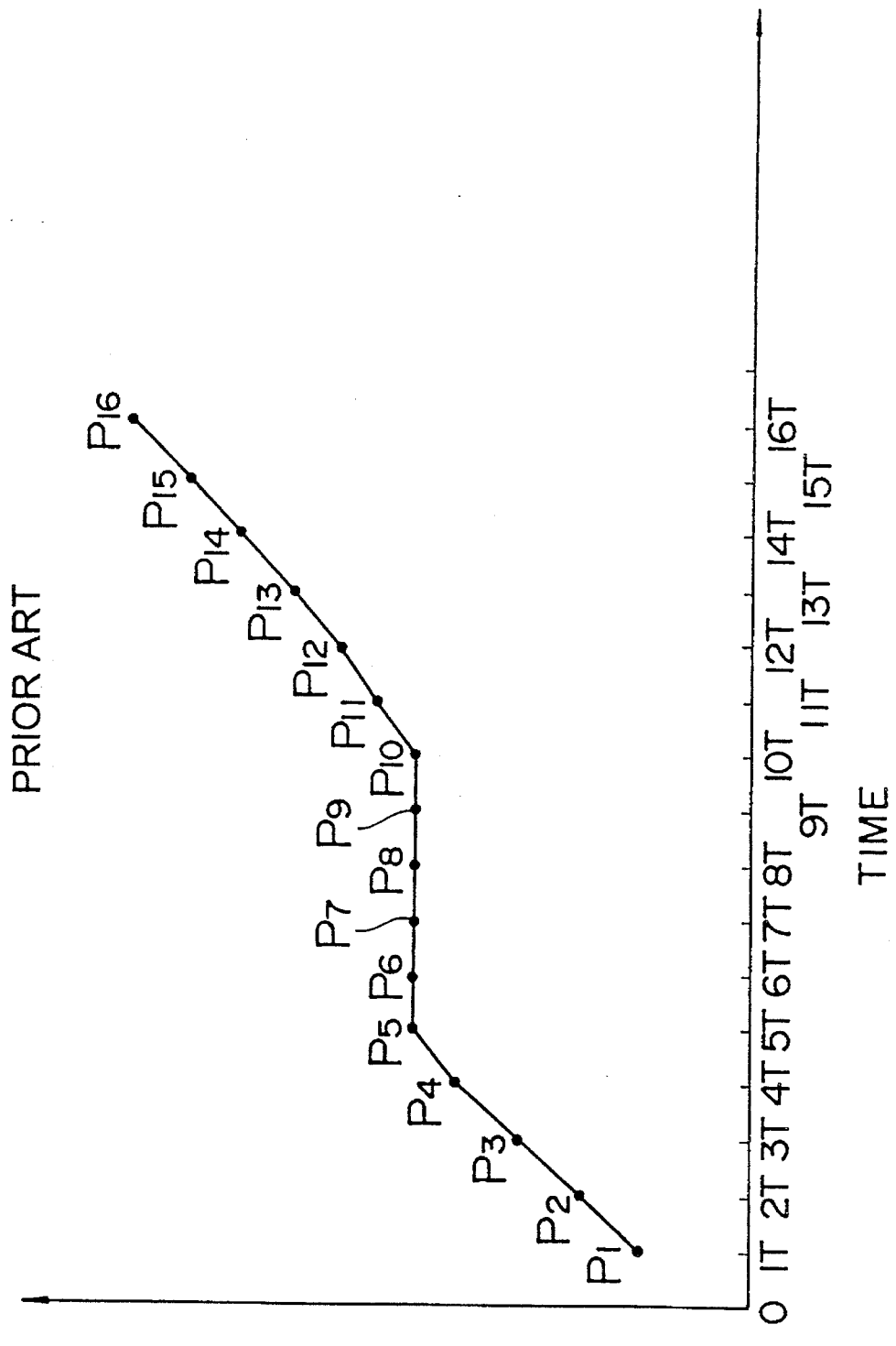
FIG. 6 is a diagram showing a locus of an axis of a robot in the case where the instruction data stored in the memory as shown in FIG. 5 is played back.

FIG. 4 illustrates the playback of the operation program. As shown in FIG. 4, the operation or movement does not contain any useless steps.

Further, when an operation program for resting the robot at a certain position is taught to the robot, the record data is turned on and off N times so that the same positional data is recorded in N steps, and the robot temporarily rests during the time of N×T in the playback.

Furthermore, in the recording of the instruction data, the robot is moved at equal intervals and the record switch 14 is turned on and off so that positional data is recorded point by point. Thus, an operation program for playing back the positional data to move the robot at equal speed can be also obtained by the position teaching method of the CP method.

In addition, useless consumption of material such as, for example, paint and sealant consumed by the tool 16 can be reduced by turning off the tool 16 in response to the interruption of the recording as shown in FIG. 3.

We claim:

1. A method of recording and playing back instruction data in a robot wherein the arms of the robot and part of a machine body of the robot are moved for recording a moving locus of the robot as instruction data at every predetermined period and for playing back said instruction data, comprising the steps of:

providing recording means for recording said instruction data;

providing, as a controller, a position transducer and a register for latching positional data from said transducer both being attached to each of a plurality of axes in cooperative action with said arms and said machine body;

providing, as a controller, a tool control switch for controlling the state of a tool attached to the top of said arm;

providing a record switch for recording or providing as instructions positional data latched in said registers usually or arbitrarily; and providing control means, which in case of recording, at every predetermined period, perform the following steps:

(a) latching the positional data of said axes in said registers, (b) when both said tool control switch and record switch are "ON" and, based on the positional data latched in said registers, when the positional data of at least any one of said axes is changed more than a predetermined constant ΔL from the positional data recorded the previous time in said recording means, or (b') when the teaching operation including the period of a temporary interruption of the teaching operation is not required, said record switch is turned "OFF" and then, when said teaching operation is required, said record switch is turned from "OFF" to "ON", said recording means recording said positional data and function data of said tool as instruction data; and said control means, in the case of playing back, serving to read out said instruction data already recorded in said recording means at every predetermined period irrespective of the time required to move the machine body when teaching, thereby playing back said instruction data by driving said controller disposed at said axes and said tool, thereby said recording means and said control means prevent said record switch from recording unnecessary positional data and also allow the robot to move at equal speed to the teaching operation by eliminating a long period of time during playing back operation.

2. In a robot, apparatus for recording and playing back instruction data in said robot wherein the arms of the robot and part of a machine body of said robot are moved for recording a moving locus of the robot as instruction data at every predetermined period, comprising:

recording means for recording said instruction data;

a position transducer functioning as a controller and a register for latching positional data from said position transducer, both said position transducer and said register being attached to each of a plurality of axes which are in cooperative action with said arms and said machine body;

a tool control switch functioning as a controller for controlling the state of a tool attached to the top of said arm;

a record switch for recording or providing as instructions positional data latched in said registers usually or arbitrarily; and control means, which in the case of recording, for performing, at every predetermined period:
  (a) latching the positional data of said axes in said registers,
  (b) when both said tool control switch and record switch are "ON" and, based on the positional data latched in said registers, when the positional data of at least any one of said axes is changed to the extent of more than a predetermined constant $\Delta L$ from the positional data recorded the previous time in said recording means, or
  (b') when the teaching operation including the period of a temporary interruption of the teaching operation is not required, said record switch is turned "OFF" and then, when said teaching operation is required, the record switch is turned from "OFF" to "ON", said recording means recording said positional data and function data of the tool as instruction data; and said control means, in the case of playing back, for reading out said instruction data already recorded in said recording means at every predetermined period irrespective of the time required to move the machine body when teaching, thereby playing back said instruction data by driving said controller disposed at said axes and said tool, thereby said recording means and said control means prevent said record switch from recording unnecessary positional data and also allow the robot to move at equal speed to the teaching operation by eliminating a long period of time during playing back operation.

* * * * *